(12) United States Patent
Gardner

(10) Patent No.: US 8,085,428 B2
(45) Date of Patent: Dec. 27, 2011

(54) PRINT SYSTEMS AND TECHNIQUES

(75) Inventor: Deane A. Gardner, Cupertino, CA (US)

(73) Assignee: Fujifilm Dimatix, Inc., Lebanon, NH (US)

( * ) Notice: Subject to any disclaimer, the term of this patent is extended or adjusted under 35 U.S.C. 154(b) by 1210 days.

(21) Appl. No.: 10/966,022

(22) Filed: Oct. 15, 2004

(65) Prior Publication Data

US 2006/0082797 A1    Apr. 20, 2006

(51) Int. Cl.
  *G06K 15/00* (2006.01)
  *G06F 3/12* (2006.01)
(52) U.S. Cl. .................. 358/1.18; 358/1.8; 358/1.15
(58) Field of Classification Search .............. 358/1.18, 358/1.15, 1.16, 1.17, 1.1, 1.11, 1.13, 404, 358/407, 444, 468, 1.8, 1.2, 1.3, 1.4, 1.5, 358/1.6, 1.7, 1.9, 2.1, 2.99, 3.01, 3.02, 3.09, 358/3.1, 3.11, 3.12, 1.12, 450, 540, 538, 358/537, 452, 453, 462; 715/274, 200, 277; 399/1, 6; 347/2, 3, 5, 14, 23; 382/303, 304, 382/305, 307
See application file for complete search history.

(56) References Cited

U.S. PATENT DOCUMENTS

| | | | |
|---|---|---|---|
| 4,486,739 A | 12/1984 | Franaszek et al. | |
| 4,563,689 A | 1/1986 | Murakami et al. | |
| 5,138,333 A | 8/1992 | Bartky et al. | |
| 5,150,048 A | 9/1992 | McAuliffe et al. | |
| 5,359,350 A | 10/1994 | Nakano et al. | |
| 5,361,084 A | 11/1994 | Paton et al. | |
| 5,361,420 A | 11/1994 | Dobbs et al. | |
| 5,369,420 A | 11/1994 | Bartky | |
| 5,408,590 A | 4/1995 | Dvorzsak | |
| 5,438,350 A | 8/1995 | Kerry | |
| 5,463,414 A | 10/1995 | Temple et al. | |
| 5,463,416 A | 10/1995 | Paton et al. | |
| 5,512,796 A | 4/1996 | Paton | |
| 5,512,922 A | 4/1996 | Paton | |
| 5,521,619 A | 5/1996 | Suzuki et al. | |
| 5,604,711 A | 2/1997 | Cheung | |
| 5,604,771 A | 2/1997 | Quiros | |
| 5,631,675 A | 5/1997 | Futagawa | |
| 5,663,217 A | 9/1997 | Kruse | |
| 5,668,579 A | 9/1997 | Fujii et al. | |
| 5,731,048 A | 3/1998 | Ashe et al. | |
| 5,779,837 A | 7/1998 | Harvey | |
| 5,784,062 A | 7/1998 | Adachi et al. | |
| 5,784,171 A | 7/1998 | Kano | |
| 5,790,139 A | 8/1998 | Umeno et al. | |

(Continued)

FOREIGN PATENT DOCUMENTS

CN    1 410 780    4/2003

(Continued)

OTHER PUBLICATIONS

U.S. Appl. No. 10/966,019, filed Oct. 15, 2004, Gardner et al.

(Continued)

*Primary Examiner* — Dov Popovici
(74) *Attorney, Agent, or Firm* — Fish & Richardson P.C.

(57) ABSTRACT

Systems and techniques for printing. In one implementation, a method includes printing, at substantially the same time, a first image on a first workpiece and a second image on a second workpiece.

30 Claims, 7 Drawing Sheets

U.S. PATENT DOCUMENTS

| | | | |
|---|---|---|---|
| 5,825,375 | A | 10/1998 | Droit et al. |
| 5,837,046 | A | 11/1998 | Schofield et al. |
| 5,842,258 | A | 12/1998 | Harvey et al. |
| 5,843,219 | A | 12/1998 | Griffin et al. |
| 5,854,886 | A | 12/1998 | MacMillan et al. |
| 5,855,713 | A | 1/1999 | Harvey |
| 5,903,754 | A | 5/1999 | Pearson |
| 5,910,372 | A | 6/1999 | Griffin et al. |
| 5,941,951 | A * | 8/1999 | Day et al. ............. 709/233 |
| 5,959,643 | A | 9/1999 | Temple et al. |
| 5,975,672 | A | 11/1999 | Wen |
| 5,984,448 | A | 11/1999 | Yanagawa |
| 5,984,464 | A | 11/1999 | Steinfield et al. |
| 5,997,124 | A | 12/1999 | Capps et al. |
| 6,010,202 | A | 1/2000 | Arnott |
| 6,014,153 | A | 1/2000 | Harvey |
| 6,033,055 | A | 3/2000 | Nagoshi et al. |
| RE36,667 | E | 4/2000 | Michaelis et al. |
| 6,046,822 | A | 4/2000 | Wen et al. |
| 6,088,050 | A | 7/2000 | Ng |
| 6,089,698 | A | 7/2000 | Temple et al. |
| 6,092,886 | A | 7/2000 | Hosono |
| 6,102,513 | A | 8/2000 | Wen |
| 6,106,092 | A | 8/2000 | Norigoe et al. |
| 6,123,405 | A | 9/2000 | Temple et al. |
| 6,193,343 | B1 | 2/2001 | Norigoe et al. |
| 6,217,141 | B1 | 4/2001 | Nakamura et al. |
| 6,228,311 | B1 | 5/2001 | Temple et al. |
| 6,232,135 | B1 | 5/2001 | Ashe et al. |
| 6,257,689 | B1 | 7/2001 | Yonekubo |
| 6,260,951 | B1 | 7/2001 | Harvey et al. |
| 6,270,179 | B1 | 8/2001 | Nou |
| 6,276,772 | B1 | 8/2001 | Sakata et al. |
| 6,281,913 | B1 | 8/2001 | Webb |
| 6,286,943 | B1 | 9/2001 | Ashe et al. |
| 6,295,077 | B1 | 9/2001 | Suzuki |
| 6,312,076 | B1 | 11/2001 | Taki et al. |
| 6,328,395 | B1 | 12/2001 | Kitahara et al. |
| 6,331,040 | B1 | 12/2001 | Yonekubo et al. |
| 6,331,045 | B1 | 12/2001 | Harvey et al. |
| 6,339,480 | B1 | 1/2002 | Yamada et al. |
| 6,352,328 | B1 | 3/2002 | Wen et al. |
| 6,379,440 | B1 | 4/2002 | Tatum et al. |
| 6,384,930 | B1 | 5/2002 | Ando |
| 6,399,402 | B2 | 6/2002 | Ashe et al. |
| 6,402,278 | B1 | 6/2002 | Temple |
| 6,402,282 | B1 | 6/2002 | Webb |
| 6,412,924 | B1 | 7/2002 | Ashe et al. |
| 6,422,690 | B1 | 7/2002 | Harvey et al. |
| 6,437,879 | B1 | 8/2002 | Temple |
| 6,460,991 | B1 | 10/2002 | Temple et al. |
| 6,467,863 | B1 | 10/2002 | Imanaka et al. |
| 6,468,779 | B1 | 10/2002 | Red'kina |
| 6,471,315 | B1 | 10/2002 | Kurata |
| 6,476,096 | B1 | 11/2002 | Molloy et al. |
| 6,505,918 | B1 | 1/2003 | Condie et al. |
| 6,517,195 | B1 | 2/2003 | Koeda |
| 6,565,191 | B1 | 5/2003 | Bolash et al. |
| 6,568,779 | B1 | 5/2003 | Pulman et al. |
| 6,572,221 | B1 | 6/2003 | Harvey et al. |
| 6,652,068 | B2 | 11/2003 | Hsu et al. |
| 6,666,537 | B1 | 12/2003 | Kelley et al. |
| 6,685,297 | B2 | 2/2004 | Butterfield et al. |
| 6,752,482 | B2 | 6/2004 | Fukano et al. |
| 6,764,154 | B2 | 7/2004 | Nishikori et al. |
| 6,882,711 | B1 * | 4/2005 | Nicol ............. 379/93.33 |
| 7,076,724 | B2 | 7/2006 | Cole et al. |
| 7,234,788 | B2 | 6/2007 | Gardner |
| 7,234,799 | B2 | 6/2007 | Kwan et al. |
| 7,436,540 | B2 | 10/2008 | Okamoto et al. |
| 2002/0033644 | A1 | 3/2002 | Takamura |
| 2002/0186393 | A1 | 12/2002 | Pochuer et al. |
| 2003/0081227 | A1 | 5/2003 | Williams et al. |
| 2003/0160836 | A1 | 8/2003 | Fukano et al. |
| 2004/0000560 | A1 | 1/2004 | Henry et al. |
| 2004/0028830 | A1 | 2/2004 | Bauer |
| 2004/0070791 | A1 | 4/2004 | Pattusamy et al. |
| 2004/0113959 | A1 | 6/2004 | Tamura |
| 2005/0018940 | A1 | 1/2005 | Obayashi |
| 2005/0041073 | A1 | 2/2005 | Fontaine et al. |
| 2005/0195229 | A1 | 9/2005 | Barss |
| 2005/0270329 | A1 | 12/2005 | Hoisington et al. |
| 2006/0066701 | A1 | 3/2006 | Hirakawa |
| 2006/0082811 | A1 | 4/2006 | Gardner et al. |
| 2006/0082812 | A1 | 4/2006 | Gardner |
| 2006/0082813 | A1 | 4/2006 | Martin et al. |
| 2006/0082814 | A1 | 4/2006 | Gardner |
| 2006/0087523 | A1 | 4/2006 | Horsnell et al. |
| 2006/0092201 | A1 | 5/2006 | Gardner |
| 2006/0092437 | A1 | 5/2006 | Martin |
| 2007/0206038 | A1 | 9/2007 | Baker |
| 2007/0236535 | A1 | 10/2007 | Baker et al. |
| 2008/0158279 | A1 | 7/2008 | Barss |

FOREIGN PATENT DOCUMENTS

| | | |
|---|---|---|
| CN | 101040505 | 9/2007 |
| CN | 101052942 | 10/2007 |
| CN | 101052943 | 10/2007 |
| CN | 101052974 | 10/2007 |
| CN | 101091153 | 12/2007 |
| CN | 101189622 | 5/2008 |
| EP | 0 375 147 | 6/1990 |
| EP | 0 600 707 A1 | 6/1994 |
| EP | 0 876 915 | 11/1998 |
| EP | 0 810 097 | 3/1999 |
| EP | 0 919 382 | 6/1999 |
| EP | 0 964 339 | 12/1999 |
| EP | 1 267 254 | 12/2002 |
| EP | 1 293 341 | 3/2003 |
| EP | 1 452 313 A | 9/2004 |
| EP | 1 452 313 A1 | 9/2004 |
| EP | 1452313 A1 * | 9/2004 |
| EP | 0 827 838 | 3/2005 |
| JP | 58055253 | 4/1983 |
| JP | 03065069 | 3/1991 |
| JP | 4273081 | 9/1992 |
| JP | H06-113143 | 4/1994 |
| JP | H09-058019 | 3/1997 |
| JP | H09-102861 | 4/1997 |
| JP | 09-231035 | 9/1997 |
| JP | 10031566 | 2/1998 |
| JP | 10336413 | 12/1998 |
| JP | H11-58891 | 3/1999 |
| JP | 11123861 | 5/1999 |
| JP | 11338651 | 12/1999 |
| JP | 2000-6389 | 1/2000 |
| JP | 2000141829 | 5/2000 |
| JP | 2000246862 | 9/2000 |
| JP | 2000255019 | 9/2000 |
| JP | 2000326560 | 11/2000 |
| JP | 2001001570 | 1/2001 |
| JP | 2001010035 | 1/2001 |
| JP | 2001-334706 | 12/2001 |
| JP | 2002512766 | 4/2002 |
| JP | 2002-171257 | 6/2002 |
| JP | 2002-292935 | 10/2002 |
| JP | 2002540701 | 11/2002 |
| JP | 2003-001879 | 1/2003 |
| JP | 2003500899 | 1/2003 |
| JP | 2003244391 | 8/2003 |
| JP | 2004094586 | 3/2004 |
| JP | 2004221629 | 8/2004 |
| JP | 2004-268511 | 9/2004 |
| JP | 08-516801 | 5/2008 |
| JP | 08-517379 | 5/2008 |
| JP | 2008-516802 | 5/2008 |
| JP | 2008-516803 | 5/2008 |
| JP | 2008-517380 | 5/2008 |
| JP | 2008-517811 | 5/2008 |
| KR | 2007-0062532 | 6/2007 |
| KR | 2007-0062549 | 6/2007 |
| KR | 2007-0065348 | 6/2007 |
| KR | 2007-0065383 | 6/2007 |
| KR | 2007-0065384 | 6/2007 |
| KR | 2007-0095277 | 9/2007 |
| WO | WO 01/12444 | 2/2001 |
| WO | WO 01/13328 | 2/2001 |

| | | |
|---|---|---|
| WO | 03/094502 | 11/2003 |
| WO | WO03/094502 | 11/2003 |
| WO | WO 2004/000560 | 12/2003 |
| WO | WO 2005/018940 | 3/2005 |
| WO | WO 2006/044530 | 4/2006 |
| WO | WO 2006/044587 | 4/2006 |
| WO | WO 2006/044597 | 4/2006 |
| WO | WO 2006/044598 | 4/2006 |
| WO | WO 2006/044599 | 4/2006 |
| WO | WO 2006/049836 | 5/2006 |
| WO | WO 2006/052466 | 5/2006 |
| WO | WO 2006/052885 | 5/2006 |

OTHER PUBLICATIONS

U.S. Appl. No. 10/966,205, filed Oct. 15, 2004, Gardner.
U.S. Appl. No. 10/966,023, filed Oct. 15, 2004, Gardner et al.
U.S. Appl. No. 10/966,024, filed Oct. 15, 2004, Gardner et al.
U.S. Appl. No. 10/977,298, filed Oct. 29, 2004, Martin.
8B/10B-encoding scheme. (8 pages) [Online], [retrieved on Sep. 3, 2008]. Retrieved from the Internet: <URL:http://en.wikipedia.org/wiki/8B/10B_encoding>.
Fibre Channel Protocol. (7 pages). [Online], [retrieved on Sep. 7, 2008]. Retrieved from the Internet: <URL:http://en.wikipedia.org/wiki/Fibre_Channel_Protocol>.
IEEE 802.3 Standard. (4 pages)[Online], [retrieved on Sep. 6, 2008]. Retrieved from the Internet: <URL:http://en.wikipedia.org/wiki/IEEE802.3>.
David A. Johns et al., "Analog Integrated Circuit Design", John Wiley & Sons, Inc., 1997. pp. 39-42, 396-397 and 398-400. Published in U.S.A. and Canada.
Sachs, "Fibre Channel and Related Standards", IEEE Communications Magazine, IEEE Service Center, vol. 34, Aug. 1996, pp. 40-50.
Fibre Channel —Physical and Signaling Interface (FC-PH), American National Standards Institute, ANSI X3.230-1994.
Authorized Officer Maria Rodriguez Novoa, International Search Report and Written Opinion issued in PCT/US2005/036934, dated Dec. 6, 2006.
Authorized Officer Nora Lindner, International Preliminary Report on Patentability for Application No. PCT/US2005/036934, dated Apr. 26, 2007.
Authorized Officer Eric Walsh, International Search Report and Written Opinion for Application No. PCT/US2005/036808, dated Feb. 21, 2006.
Authorized Officer Beate Giffo-Schmitt, International Preliminary Report on Patentability for Application No. PCT/US2005/036808, dated Apr. 26, 2007.
Japanese Office Action dated Aug. 10, 2010 issued in JP 2007-536879, 2 pages.
Uncertified English translation of Japanese Office Action dated Aug. 10, 2010 issued in JP 2007-536879, 3 pgs.
Japanese Office Action dated Jul. 13, 2010 issued in 2007-536905, 3 pages.
Uncertified English translation of Japanese Office Action dated Jul. 13, 2010 issued in 2007-536905, 3pgs.
Japanese Office Action dated Aug. 17, 2010 issued in JP 2007-536913, 3 page.
Uncertified English translation of Japanese Office Action dated Aug. 17, 2010 issued in JP 2007-536913, 2 pgs.
Japanese Office Action dated Oct. 12, 2010 issued in JP 2007-538968, 2 pages.
Machine Translation of Japanese Patent No. JP-10-336413 available from Patent Abstracts of Japan, http://www4.ipdl.inpit.go.jp/Tokujitu/tjsogodben.ipdl?N0000=115, 12 pgs.
Machine Translation of Japanese No. JP2000-141829 available from Patent Abstracts of Japan, http://www4.ipdl.inpit.go.jp/Tokujitu/tjsogodben.ipdl?N0000=115, 10 pgs.
Machine Translation of Japanese Patent No. JP-2003-500899 available from Patent Abstracts of Japan, http://www4.ipdl.inpit.go.jp/Tokujitu/tjsogodben.ipdl?N0000=115, 17 pgs.
Machine Translation of Japanese Patent No. JP-2004-221629 available from Patent Abstracts of Japan, http://www4.ipdl.inpit.go.jp/Tokujitu/tjsogodben.ipdl?N0000=115, 25 pgs.
Machine Translation of Japanese Patent No. JP-2001-001570 available from Patent Abstracts of Japan, http://www4.ipdl.inpit.go.jp/Tokujitu/tjsogodben.ipdl?N0000=115, 18 pgs.
Machine Translation of Japanese Patent No. JP-2004-094586 available from Patent Abstracts of Japan, http://www4.ipdl.inpit.go.jp/Tokujitu/tjsogodben.ipdl?N0000=115, 11 pgs.
Machine Translation of Japanese Patent No. JP-2003-244391, available from Patent Abstracts of Japan, http://www4.ipdl.inpit.go.jp/Tokujitu/tjsogodben.ipdl?N0000=115, 14 pgs.
Machine Translation of Japanese Patent No. JP2000-255019 available from Patent Abstracts of Japan, http://www4.ipdl.inpit.go.jp/Tokujitu/tjsogodben.ipdl?N0000=115, 10 pgs.
Machine Translation of Japanese Patent No. JP2000-326560, available from Patent Abstracts of Japan, http://www4.ipdl.inpit.go.jp/Tokujitu/tjsogodben.ipdl?N0000=115, 18 pgs.
Machine Translation of Japanese Patent No. JP2000-246862, available from Patent Abstracts of Japan, http://www4.ipdl.inpit.go.jp/Tokujitu/tjsogodben.ipdl?N0000=115, 8 pgs.
Office Action dated Feb. 3, 2011 issued in European Application No. 05810626.1, 4 pgs.
Uncertified English translation of Office Action dated Oct. 12, 2010 issued in Japanese Application No. 2007-538968, 5 pgs.
Office action issued Mar. 15, 2011 in Japanese Application No. 2007-536915, 21 pgs., and uncertified translation thereof.
Office action issued Apr. 6, 2011 in European Application No. 05809003.6 , 4 pgs.
Office action issued Mar. 8, 2011 in Japanese Application No. 2007-536914, 12 pgs., and uncertified translation thereof.
Office action issued Mar. 9, 2011 in Chinese Application No. 201010167530.7, 5 pgs, and uncertified translation thereof.
Office action issued Jan. 11, 2011 in Japanese Application No. 2007-536905, 4 pgs., and uncertified translation thereof.
Office Action dated Feb. 3, 2011 issued in European Application No. 05810626.1, 4 pgs.
Office action issued Jun. 21, 2011 in Japanese Application No. 2007-538968, 3 pgs., no. translation currently available.
Machine Translation of Japanese Patent No. JPH09-102861, available May 5, 2011 from Patent Abstracts of Japan, http://www4.ipdl.inpit.go.jp/Tokujitu/tjsogodben.ipdl?N0000=115.
Machine Translation of Japanese Patent No. 2002-292935, available May 10, 2011 from Patent Abstracts of Japan, http://www4.ipdl.inpit.go.jp/Tokujitu/tjsogodben.ipdl?N0000=115.
Machine Translation of Japanese Patent No. 2002-171257, available May 10, 2011 from Patent Abstracts of Japan, http://www4.ipdl.inpit.go.jp/Tokujitu/tjsogodben.ipdl?N0000=115.
Machine Translation of Japanese Patent No. H09-058019, available May 10, 2011 from Patent Abstracts of Japan, http://www4.ipdl.inpit.go.jp/Tokujitu/tjsogodben.ipdl?N0000=115.
Machine Translation of Japanese Patent No. JP2004-276394, available May 10, 2011 from Patent Abstracts of Japan, http://www4.ipdl.inpit.go.jp/Tokujitu/tjsogodben.ipdl?N0000=115.
Machine Translation of Japanese Patent No. H06-113143, available May 10, 2011 from Patent Abstracts of Japan, http://www4.ipdl.inpit.go.jp/Tokujitu/tjsogodben.ipdl?N0000=115.
Machine Translation of Japanese Patent No. 09-231035, available May 10, 2011 from Patent Abstracts of Japan, http://www4.ipdl.inpit.go.jp/Tokujitu/tjsogodben.ipdl?N0000=115.
Machine Translation of Japanese Patent No. 2001-334706, available May 10, 2011 from Patent Abstracts of Japan, http://www4.ipdl.inpit.go.jp/Tokujitu/tjsogodben.ipdl?N0000=115.
Machine Translation of Japanese Patent No. 2003-001879, available May 10, 2011 from Patent Abstracts of Japan, http://www4. ipdl.inpit.go.jp/Tokuji/tjsogodben.ipdl?N0000-115.
Machine Translation of Japanese Patent No. H11-58891, available Jun. 30, 2011 from Patent Abstracts of Japan, http://www4.ipdl.inpit.go.jp/Tokujitu/tjsogodben.ipdl?N0000=115.
Machine Translation of Japanese Patent No. 2004-268511, available Jun. 30, 2011 from Patent Abstracts of Japan, http://www4.ipdl.inpit.go.jp/Tokujitu/tjsogodben.ipdl?N0000=115.
Machine Translation of Japanese Patent No. 2000-6389, available Jun. 30, 2011 from Patent Abstracts of Japan, http://www4.ipdl.inpit.go.jp/Tokujitu/tjsogodben.ipdl?N0000=115.

Office action dated Jun. 21, 2011 issued in Japan application No. 2007-536879 and uncertified English translation, 5 pgs.

Uncertified English translation of office action issued Jun. 21, 2011 in Japanese Application No. 2007-538968, 3 pgs.

U.S. Appl. No. 10/966,024, filed Oct. 15, 2004.

Office Action dated Aug. 4, 2008 issued in U.S. Appl. No. 10/966,024.

Office Action dated Jan. 27, 2009 issued in U.S. Appl. No. 10/966,024.

Chinese Office Action dated Jan. 16, 2009 issued in CN200580035204.8.

Chinese Office Action dated Jul. 18, 2008 issued in CN200580035204.8.

Chinese Office Action dated Feb. 12, 2010 issued in CN 200580035215.6.

Chinese Office action dated Mar. 13, 2009 issued in CN200580035215.6, 18 pgs.

European Office Action dated Mar. 24, 2009 issued in EP 05807759.5.

* cited by examiner

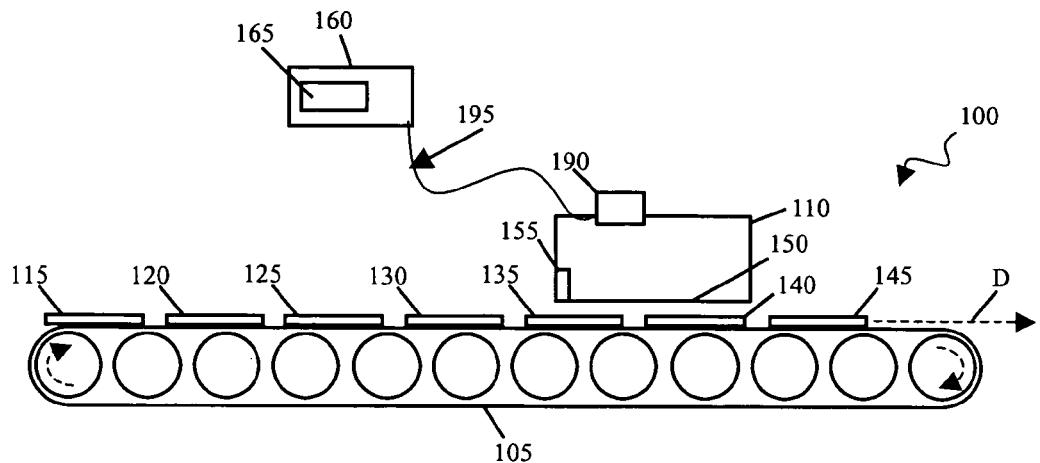
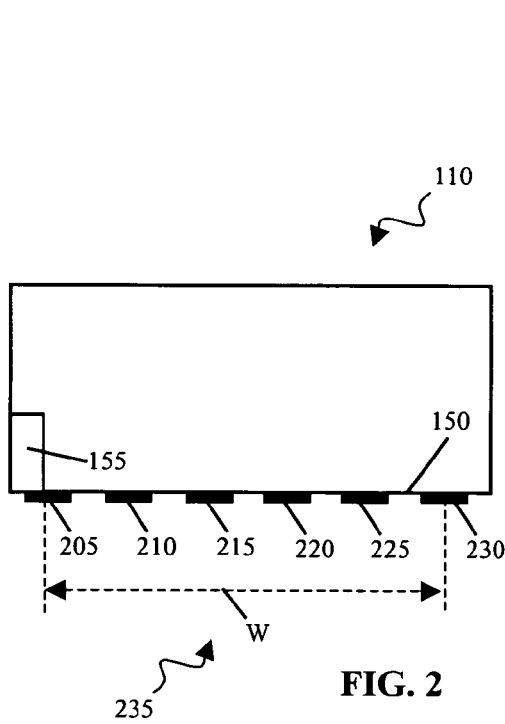
FIG. 2
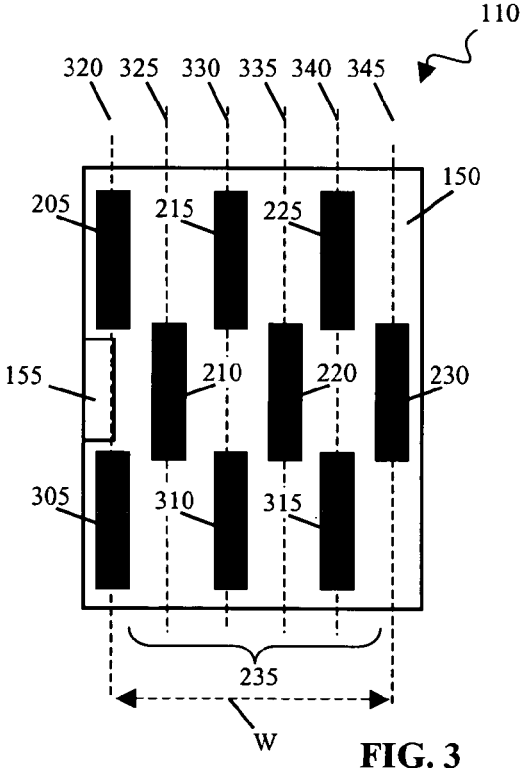
FIG. 3

PRINT SYSTEMS AND TECHNIQUES

BACKGROUND

This disclosure relates to print systems and techniques.

When an image such as a picture or a page of text is printed, image data is generally translated into a format understandable by a printing device and relayed to a print buffer associated with the printing device. The print buffer receives the translated image data and stores at least a portion of the image data for subsequent printing by the printing device.

Many printing devices include multiple discrete print elements (e.g., an inkjet nozzle in an inkjet print module). The print elements can be deployed to print selected components of the image. For example, selected print elements can be deployed to print at selected locations on a workpiece. As another example, in color printing, selected print elements can be deployed to print selected colors. Image data from the print buffer can be used by control electronics to coordinate the printing of images by deployed print elements.

The print elements in a printing device can be arranged in groups called print modules. The print elements in a module can be grouped according to the deployment of the constituent elements. For example, print elements that print at a selected array of positions can be grouped in a print module. As another example, print elements that print a selected color (at a selected array of positions) can be grouped in a print module.

SUMMARY

Described herein are methods and apparatus, including computer program products, that relate to printing images in accordance with print element associations.

In one general aspect, the techniques feature a method of printing one or more images. That method includes gathering sets of image data to be printed at a printing device where the printing device includes print element associations and the sets of image data include a first and second set of image data. Gathering the sets of image data includes gathering the first and second sets of image data, where the first set of image data is divided into a first set of portions and the second set of image data is divided into a second set of portions, and each portion of the first set of portions is associated with a print element association at the printing device and each portion of the second set of portions is associated with a print element association at the printing device. The method further includes providing to at least one of the print element associations an associated portion of the first set of image data and to at least one of the print element associations an associated portion of the second set of image data.

Implementations may include one or more of the following features. The method may further include printing the first and second sets of image data according to the print element associations. Printing the first and second sets of image data may include printing on a first workpiece the portions of the first set of image data and printing on a second workpiece the portions of the second set of image data. Printing the first and second sets of image data may include printing on a workpiece the portions of the first set of image data and printing on the workpiece the portions of the second set of image data. Printing the first and second sets of image data according to the print element associations may include printing each portion of the first and second sets of image data at substantially the same time. Printing the first and second sets of image data may include printing the first and second sets of image data as soon as the first and second sets of image data are available for printing.

Gathering the first and second sets of image data may include generating a data packet to be sent to the printing device, the data packet comprising the first and second sets of image data. Providing the first and second sets of image data may include sending a data packet to the printing device that includes the first and second sets of image data. The first set of image data may represent a portion of a first image and the second set of image data may represent a portion of a second image.

The first set of image data may represent a portion of an image and the second set of image data may represent a different portion of the image (i.e., the same image; e.g., two different portions of a same image, such as the last section of an image and the first section of an image). The print element associations may include print elements arranged laterally in a same column across an effective printing area.

In another aspect, the techniques feature a method of printing one or more images. That method includes receiving a first set of image data to be printed at a printing device, receiving a second set of image data to be printed at the printing device, providing to at least one print element association an associated portion of the received first set of image data and to at least one print element association an associated portion of the received second set of image data, and printing the first and second sets of received image data according to the print element associations. In that method, the first set of image data is divided into a first set of portions, where each portion of the first set of portions is associated with one print element association at the printing device. Also, the second set of image data is divided into a second set of portions, where each portion of the second set of portions is associated with one of the print element associations at the printing device.

Implementations may include one or more of the following features. The method may further include receiving an Nth set of image data to be printed at the printing device, where the Nth set of image data is divided into an Nth set of portions and each portion of the Nth set of portions is associated with one of print element associations at the printing device; providing to at least one of the print element associations an associated portion of the Nth set of received image data; and printing the Nth set of received image data and at least one other set of image data at the print element associations.

The print element associations may include print elements arranged laterally in a same column across an effective printing area. Printing the first and second sets of received image data according to the print element associations may include printing each portion of the received image data at substantially the same time. Printing the first and second sets of received image data may include printing the first and second sets of received image data as soon as the first and second sets of received image data are available for printing.

In one general aspect, the techniques feature a method of printing one or more images. That method includes receiving image data to be printed at a printing device, where the image data represents two or more images and is divided into portions, each portion corresponding to a print element association; providing to each of the print element associations the corresponding portion of image data; and controlling each association of print elements to print its corresponding portion of image data at substantially a same time.

Implementations may include one or more of the following features. The print element associations may include print elements arranged laterally in a same column across an effective printing area. The image data may be divided such that each Nth portion of the portions corresponds to an Nth print element association.

In another aspect, the techniques feature a method including dividing two or more sets of image data into portions according to a deployment of print elements at a printing device, the sets of image data including a first set of image data and a second set of image data; allocating the divided image data to different memory locations; detecting a position of a workpiece at the printing device; communicating the divided image data from the different memory locations to the print elements along a communication path; and timing printing of the divided image data by the print elements based on the detected position of the workpiece, where printing includes a first set of print element associations printing the divided image data representing the first image and a second set of print element associations printing the divided image data representing the second image.

Implementations may include one or more of the following features. Printing may further include an Nth set of print element associations printing divided image data representing an Nth image. Printing may further include the print element associations printing divided image data at substantially the same time. Allocating the divided image data to different memory locations may include allocating the divided image data to individual memory buffers. The individual memory buffers may be elements of respective queues of individual memory buffers. Allocating the divided image data to individual memory buffers may include allocating the divided image data to an individual memory buffer dedicated to selected print elements. Timing the printing may include timing arrival of the divided image data at the print elements based on the position of the workpiece. Timing the arrival of the divided image data may include introducing a delay into the communication path. Introducing the delay into the communication path may include causing a data pump to delay the arrival of a first portion of the divided image data.

In another aspect, a print system includes a printer housing and control electronics. The printer housing includes a collection of print elements arranged across an effective print area. The control electronics can direct the collection of print elements to print a first image and a second image at substantially the same time.

Implementations may include one or more of the following features. The print elements may be inkjet nozzles. The print system may further include a data processing device that can perform operations in accordance with logic of a set of machine-readable instructions, where the operations include dividing a collection of image data into portions according to a deployment of the print elements. The print system may further include a timing element that can time the printing of the image data portions according to the deployment of the print elements.

In another aspect, a print system includes an effective print area including print elements deployed in two or more associations; control electronics that can divide image data into portions according to a deployment of the associations in the effective print area; two or more different memory locations where each memory location can store a portion of the image data for a print element association; and a timing element that can time printing of the image data portions by the print element associations, where printing includes a first set of print element associations printing divided image data representing a first image and a second set of print element associations printing divided image data representing a second image.

Implementations may include one or more of the following features. The effective print area may include print elements deployed in associations according to a color printed by the print elements, and the control electronics may be configured to divide the image data into portions according to the color printed by the print elements. The effective print area may include print elements deployed in associations according to the lateral position printed by the print elements, and the control electronics may be configured to divide the image data into portions according to the lateral position printed by the print elements. The effective print area may include print elements deployed in associations according to an expanse spanned by a collection of the print elements, and the control electronics may be configured to divide the image data into portions according to the expanse spanned by the collection of the print elements. The timing element may include a delay configured to time printing of the image data portions by the print element associations.

The described print systems and techniques can be implemented to realize one or more of the following advantages. Different images can be printed simultaneously on respective portions of multiple workpieces arranged in succession. This can increase the throughput of workpieces and the net speed of printing. The printing may be one-pass printing.

Image data that represents an image to be printed can be divided according to the deployment of associations of print modules and/or print elements in a printing device. The divided image data can be stored at different memory locations, depending on the deployment of print element associations. The different memory locations can be individual memory buffers within queues of buffers.

Once the image data is divided by deployment of associations of print elements and/or print modules, simple hardware and/or software may be employed to continuously print different images in rapid succession, with small and variable non-printed areas between the images (e.g., space between articles on which images are printed). In a print system including a computer system and a printing device, the computer system may process image data, store buffers of image data, have hardware for inserting positional delays into image data, and send the image data to the printing device just in time for printing. Because the computer system may process the image data, store the image data, and insert delays into image data, hardware resources, such as memory and processing resources, may be reduced at the printing device. Non-printed areas may be vanishingly small such that different images may be printed immediately next to each other.

The details of one or more implementations are set forth in the accompanying drawings and the description below. Other features and advantages of the disclosed systems and techniques will be apparent from the description and drawings, and from the claims.

DESCRIPTION OF DRAWINGS

FIG. 1 is a block diagram of a print system.

FIGS. 2 and 3 illustrate an arrangement of print modules and print elements in the print system of FIG. 1.

Like reference symbols in the various drawings indicate like elements.

DETAILED DESCRIPTION

Figure 4:
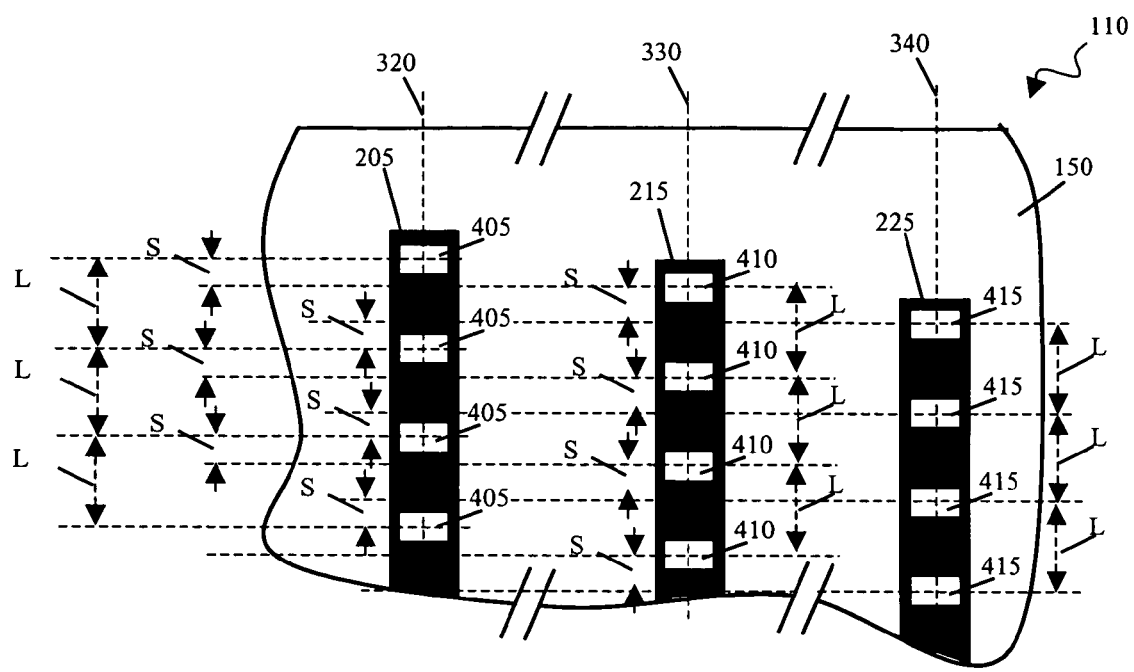
FIG. 4 schematically illustrates the deployment of print elements with relative shifts in lateral position.

FIG. 1 is a block diagram of a print system 100. Print system 100 includes a workpiece conveyor 105 and a printer housing 110. Workpiece conveyor 105 produces relative motion between a series of workpieces 115, 120, 125, 130, 135, 140, 145 and printer housing 110. In particular, workpiece conveyor 105 conveys workpieces 115, 120, 125, 130, 135, 140, 145 in a direction D across a face 150 of printer housing 110. Workpiece conveyor 105 can include a stepper or continuous motor that moves a roller, a belt, or other element that can retain workpieces 115, 120, 125, 130, 135, 140, 145 during conveyance. Workpieces 115, 120, 125, 130, 135, 140, 145 can be any of a number of different substrates upon which system 100 is to print. For example, workpieces 115, 120, 125, 130, 135, 140, 145 can be paper, cardboard, microelectronic devices, or foodstuffs.

Printer housing 110 houses a workpiece detector 155. Workpiece detector 155 can detect the position of one or more workpieces 115, 120, 125, 130, 135, 140, 145. For example, workpiece detector 155 can be a laser/photodetector assembly that detects the passage of edges of workpieces 115, 120, 125, 130, 135, 140, 145 across a certain point on face 150.

Located remotely from the printer housing 110 are control electronics 160. The control electronics 160 interface with the printer housing 110 by a cable 195 (e.g., an optical cable) and minimal electronics 190. Control electronics 160 control the performance of print operations by system 100. Control electronics 160 can include one or more data processing devices that perform operations in accordance with the logic of a set of machine-readable instructions. Control electronics 160 may be, for example, a personal computing system that runs image processing software and software for controlling printing at the printer housing 110.

Located within the control electronics 160 is a print image buffer 165. Print image buffer 165 is one or more data storage devices that store image data for printing by print elements. For example, print image buffer 165 can be a collection of random access memory (RAM) devices. Print image buffer 165 can be accessed by control electronics 160 to store and retrieve image data.

The control electronics 160 interface with the printer housing 110 via the cable 195 and minimal electronics 190. The control electronics 160 can send data across the cable 195, and the minimal electronics 190 can receive that data for printing at the printer housing 110. The control electronics 160 may have special circuitry (e.g., a data pump, as described in more detail in reference to FIG. 10, that can receive and/or retrieve image data from print image buffers, store the image data, and enable print elements at a printing device to receive image data in time to deposit ink on the corresponding image locations on workpieces as they are moving along a conveyor) for generating data to send to the printer housing 110. The minimal electronics 190 may be, for example, a field-programmable gate array that includes a microprocessor, transceiver, and minimal memory. The minimal electronics 190 may be connected to the printer housing 110 such that the minimal electronics 190 can be disconnected easily should the printer housing 110 and/or hardware in the printer housing 110 be changed. For example, if the printer housing 110 is replaced with a newer printer housing containing newer printing modules, the minimal electronics 190 can be disconnected from the older printer housing 110 and connected to the newer printer housing.

The printing of an image is divided between the control electronics 160 and the minimal electronics 190 such that the control electronics performs image processing and controls printing, whereas the minimal electronics 190 receives data received via the cable 195 and uses that data to cause firing of print elements at the printer housing 110. Thus, for example, image data may be converted to jetmap image data, which may include dividing the image data into multiple image queues of image buffers as part of the process of converting to jetmap image data (as described in more detail later); delays may be inserted into image data (e.g., inserting delays corresponding to a deployment of print element associations); and image data may be sent (e.g., encoding data packets of image data and sending by a receiver) at an appropriate time by the control electronics 160; whereas, the minimal electronics 190 may merely receive the image data (e.g., decode image data packets sent across the cable 195) and relay the image data such that the image data is printed on a workpiece (e.g., cause firing of inkjet nozzles according to the image data). The control electronics 160 may synchronize printing of an image at the printer housing 110. Following the previous example, the control electronics 160 may synchronize the printing of an image by receiving an indication of a leading edge of a workpiece and sending image data across the cable 195 to cause the printing of an image at the printer housing 110.

The control electronics 160 can send image data to the printer housing 110 at high data rates to enable "just-in-time" printing of images on the workpieces as the workpieces move along the workpiece conveyor 105. In one implementation of just-in-time printing, transmission of image data to the printer housing 110 can serve as a trigger that causes the image data in a packet to be printed "substantially immediately" as the data arrives at the printer housing 110. In this implementation, the image data may not be stored on a storage component on the printer housing prior to printing the image data, but can be printed as the data arrives at the printer housing. Just-in-time printing may also refer to printing image data substantially at an instant at which the image data arrives at the printer housing.

In another implementation of just-in-time printing, data received at the printer housing is stored in one or more latches, and new or subsequent data that is being received at the printer housing can serve as a trigger to print the latched data. In this implementation, the data received at the printer housing is stored in a latch until the subsequent data arrives at the printer housing, and the subsequent data arriving at the printer housing can serve as a trigger to print the data that has been latched. The data, subsequent data, and latched data may be received and/or stored at the printer housing in the form of an image data packet. In one case, the subsequent data arriving at the printer housing is the next subsequent data. Alternatively, the subsequent data arriving at the printer housing is subsequent data other than the next subsequent data, such as subsequent data arriving after the next subsequent data. Because the image data is being printed at such a high-data rate, the data printed from latched data can also refer to data being printed "substantially immediately" as the data is arriving at the printer housing.

Because the printer housing 110 has minimal electronics 190 and a reduced amount of memory, the printer housing 110 may be implemented at a lower cost. The type of memory used on the printer housing 110 may also be implemented at a lower cost. In one implementation, the type of memory implemented on the printer housing 110 is part of a field-programmable gate array (FPGA) integrated circuit (IC) that may be part of the minimal electronics 190. The costs and engineering design efforts to implement the printer housing 110 may also be reduced due to little or no buffering of high speed image data at the printer housing 110. The system 100 may offer scalable transmission of high bandwidth, synchronous, just-in-time image data to the printer housing 110 in a number of configurations, including, for example, a configuration with multiple FGPAs at the printer housing 110, each of which may implement the minimal electronics 190 and interface with one or more data pumps using one or more cables.

FIGS. 2 and 3 illustrate the arrangement of print modules and print elements on housing 110. In particular, FIG. 2 shows housing 110 from the side, whereas FIG. 3 shows housing 110 from below.

Housing 110 includes a collection of print modules 205, 210, 215, 220, 225, 230, 305, 310, 315 on face 150. Print modules 205, 210, 215, 220, 225, 230, 305, 310, 315 each include one or more print elements. For example, print modules 205, 210, 215, 220, 225, 230, 305, 310, 315 can each include a linear array of inkjet nozzles.

Print modules 205, 305 are arranged laterally along a column 320. Print module 210 is arranged along a column 325. Print modules 215, 310 are arranged laterally along a column 330. Print module 220 is arranged along a column 335. Print modules 225, 315 are arranged laterally along a column 340. Print module 230 is arranged along a column 345. This arrangement of print modules 205, 210, 215, 220, 225, 230, 305, 310, 315 along columns 325, 330, 335, 340, 345 spans an effective print area 235 on face 150. Effective print area 235 has a longitudinal width W that spans from the print elements in print modules 205, 305 to the print elements in print module 230.

Print modules 205, 210, 215, 220, 225, 230, 305, 310, 315 can be deployed in print element associations to print selected components of an image. For example, print modules 205, 210, 305 can be deployed in a first print element association to print a first color across the entire lateral expanse of a substrate moving across face 150, print modules 215, 220, 310 can be deployed in a second print element association to print a second color across the entire lateral expanse, and print modules 225, 230, 315 can be deployed in a third print element association to print a third color across the entire lateral expanse.

As another example, the group of print modules 205, 210, 215, 220, 225, 230, 305, 310, 315 can be deployed in print element associations based on the columnar position of the constituent print elements in the modules. For example, a first print element association can include modules 205, 305 deployed so that their constituent print elements are arranged in a single column. A second print element association can include only print module 210. Modules 215, 310 can form a third association. Associations four, five, and six include modules 220, 225 and 315, and 230, respectively. Forming associations of print elements in this columnar manner allows the printing of back-to-back dissimilar images with variable but small or nonexistent non-printed area between finished image areas, relative to longitudinal width W, without need for complex real-time adjustments in image data.

As another example, the group of print modules 205, 210, 215, 220, 225, 230, 305, 310, 315 can be deployed in print element associations based on the lateral position of the constituent print elements in the modules. For example, a first print element association can include modules 205, 210, 305 deployed so that their constituent print elements are shifted in lateral position relative to the print elements in modules 215, 220, 310 and to the print elements in modules 225, 230, 315.

A second print element association can include print modules 215, 220, 310 deployed so that their constituent print elements are shifted in lateral position relative to the print elements in modules 205, 210, 305 and to the print elements in modules 225, 230, 315. Modules 225, 230, 315 can form a third association. The relative shifts in position can be smaller than the lateral spacing of the print elements in the modules to, in net effect, decrease the lateral spacing between print elements on housing 110 and thereby effectively increase the resolution at which an image can be printed.

As another example, groups of print modules can be deployed in print element associations based on the lateral expanses covered by the print modules. For example, a first print element association can include modules 205, 305, 215, 310, 225, 315 deployed to cover the laterally outer expanses of a workpiece. A second print element association can include print modules 210, 220, 230 deployed to cover the laterally central expanses of a workpiece.

As another example, groups of print elements can be deployed in print element associations based on a combination of these and other factors. For example, groups of print elements can be deployed in a print element association based on their printing the color cyan on an outer extent of a workpiece. As another example, groups of print modules can be deployed in a print element association based on their constituent print elements printing at certain lateral positions on the laterally outer expanses of a workpiece.

Each print element association can have a dedicated memory location in print image buffer 165 (shown in FIG. 1) in that the association prints image data that once resided in the memory location. For example, when print image buffer 165 is a collection of queues of individual buffers, each print element association can have an individual, dedicated queue of buffers.

FIG. 4 schematically illustrates a deployment of print elements with relative shifts in lateral position. The illustrated portion of housing 110 includes print modules 205, 215, 225. Print module 205 includes an array of print elements 405 laterally separated from one another by a distance L. Print module 215 includes an array of print elements 410 laterally separated from one another by a distance L. Print module 225 includes an array of print elements 415 laterally separated from one another by a distance L.

Print elements 405 are shifted relative to the lateral position of print elements 410 by a shift distance S. Print elements 405 are shifted relative to the lateral position of print elements 415 by shift distance S. Print elements 410 are shifted relative to the lateral position of print elements 415 by shift distance S. Shift distance S is smaller than distance L, and the net effect of the relative lateral shifts between print elements 405, print elements 410, and print elements 415 is to decrease the overall lateral spacing between print elements on face 150 of housing 110.

Figure 5:
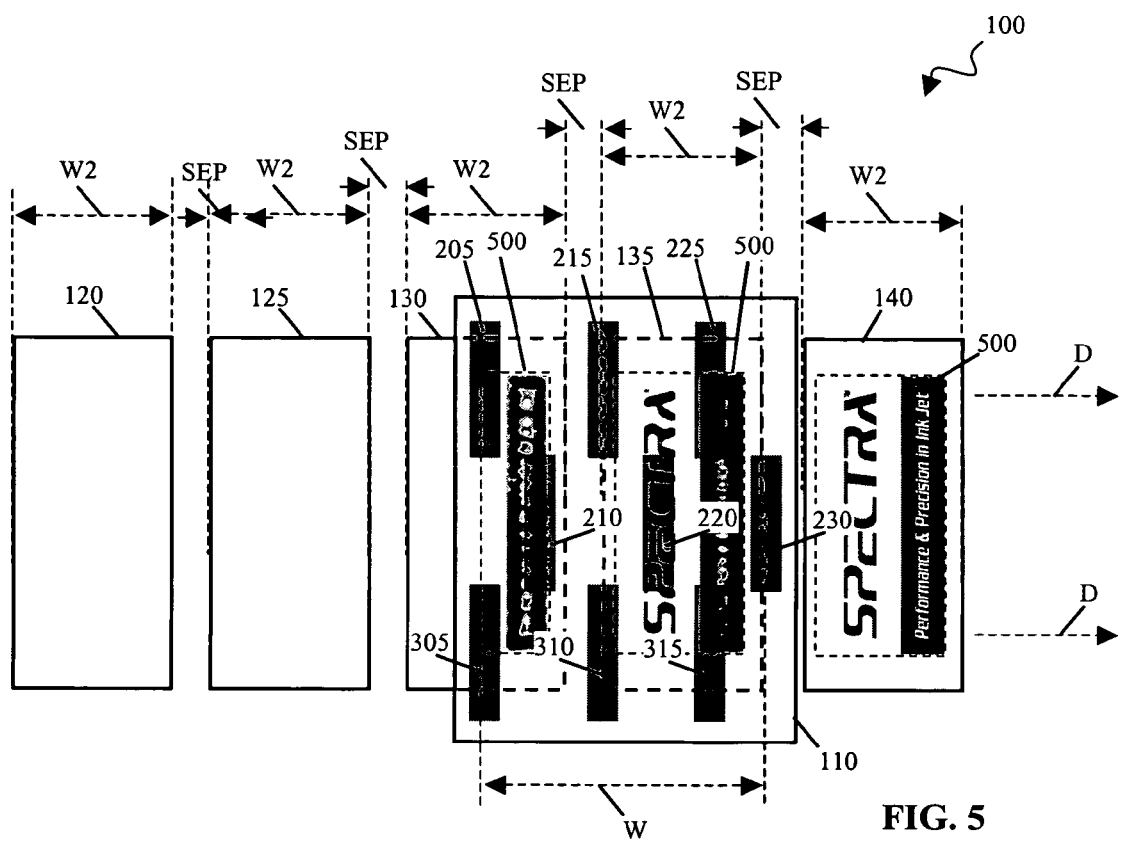
FIG. 5 schematically illustrates the serial printing of an image on different workpieces.

FIG. 5 schematically illustrates the serial printing of an image 500 on two or more different workpieces using print system 100. A series of workpieces 120, 125, 130, 135, 140 is conveyed across effective print area 235 on face 150 of printer housing 110 for printing. Image 500 can be serially printed in that image 500 can be printed sequentially on workpieces 120, 125, 130, 135, 140 (i.e., the same image is printed, in succession, on various workpieces).

Workpieces 120, 125, 130, 135, 140 each have a longitudinal width W2. Workpiece width W2 is smaller than width W of effective print area 235. A leading edge of workpiece 120 is separated from a trailing edge of workpiece 125 by separation distance SEP. A leading edge of workpiece 125 is separated from a trailing edge of workpiece 130 by separation distance SEP. A leading edge of workpiece 130 is separated from a trailing edge of workpiece 135 by separation distance SEP. A leading edge of workpiece 135 is separated from a trailing edge of workpiece 140 by separation distance SEP. The separation distance SEP may be smaller than width W of effective print area 235. The separation distance SEP may be zero. As such, both workpiece 130 and workpiece 135 may be positioned in effective print area 235 simultaneously and be printed on at the same time.

System 100 has partially printed image 500 on both workpiece 130 and workpiece 135. Such serial printing of image 500 on two or more different workpieces using a single effective print area speeds the throughput of workpieces in system 100.

Figure 6:
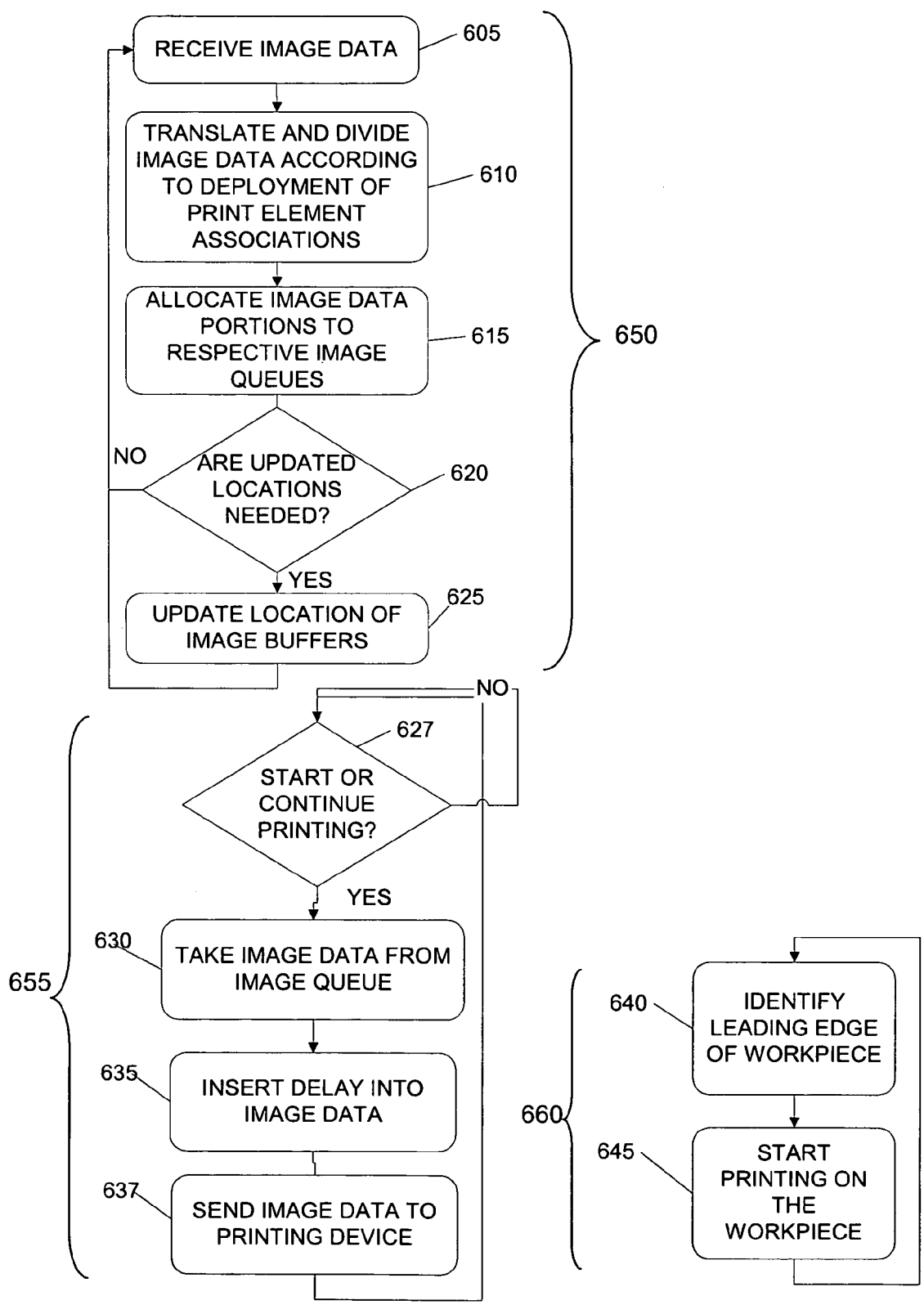
FIG. 6 includes flowcharts of processes for the serial printing of an image on different workpieces.

FIG. 6 includes flowcharts of processes 650, 655, 660 for the serial printing of an image on two or more different workpieces using a single effective print area. Processes 650, 655, 660 can be performed in whole or in part by a data processing apparatus and/or circuitry configured to exchange data with a buffer and control printing by print elements. In system 100, processes 650, 655, 660 can be performed by control electronics 160 using input received from workpiece conveyor 105 and workpiece detector 155. Within the control electronics 160, different processes may be performed by different parts of the system 100. For example, the process 650 may be performed by software operating in the control electronics 160 and the processes 655 and 660 may be performed by a data pump. The processes of 650, 655, and 660 are separate to indicate that they can be performed concurrently and/or independently of each other.

The system performing the process 650 receives image data at 605. The image data can be a stand-alone collection of data regarding an individual image. For example, the image data can be a graphic image format (gif) file, a joint photographic experts group (jpeg) file, PostScript, Printer Command Language (PCL), or other image data collection.

The system can then translate and divide the received image data according to a deployment of associated print elements at 610. The image data can be translated before it is divided, divided before it is translated, or translated and divided as part of the same process. The translation of image data can include, for example, a conversion of image data into a format understandable by a printing device, such as bitmap raster data, and a further conversion of the bitmap raster data into jetmap data. Converting bitmap raster image data into jetmap data involves taking an input bitmap, which is arranged in an order corresponding to a geographic order used by the bitmap image format, and rearranging the bitmap raster image data to correspond to physical locations of the print elements. It may also involve dividing the image data as part of the process of converting the bitmap raster image data to jetmap data (i.e., the jetmap data is divided into image buffers corresponding print element associations). As an example, the process at 610 may include converting jpeg formatted image data to bitmap formatted image data, and then converting the bitmap formatted image data into jetmap image data as image buffers corresponding to print element associations. In an alternative implementation, image data may be converted directly to jetmap data without first converting to an intermediary format.

The division of image data according to the deployment of associated print elements can include the identification of portions of the image data that are to be printed by an association of print elements based on the deployment of the association.

Figure 7:
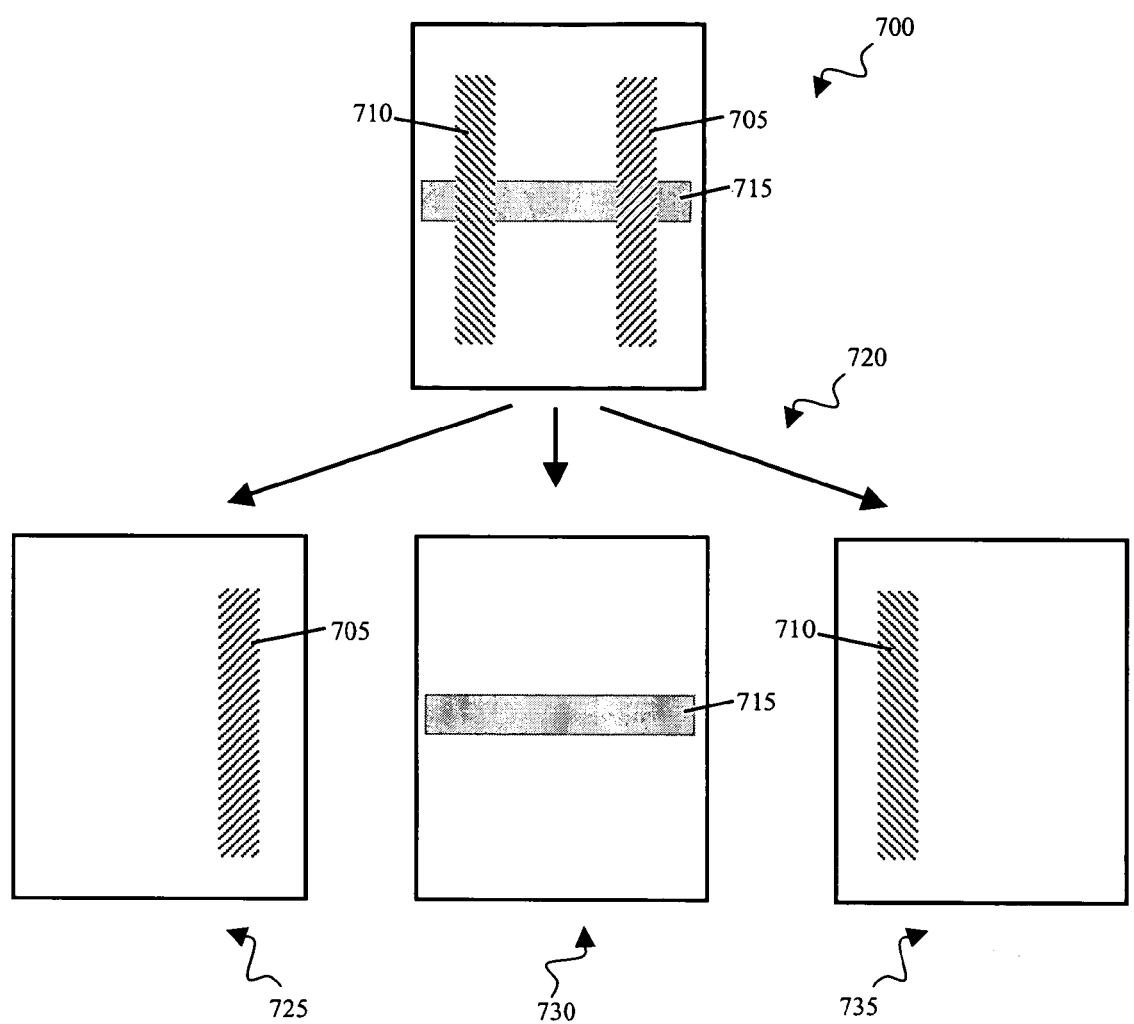
FIGS. 7, 8, and 9 illustrate implementations of a division of image data according to a deployment of print element associations.

FIG. 7 illustrates one implementation of the division of image data representing an image 700 according to a deployment of print element associations. Image 700 includes a cyan line 705, a magenta line 710, and a yellow line 715. Cyan line 705 is printable by an association of print elements deployed to print cyan. Magenta line 710 is printable by an association of print elements deployed to print magenta. Yellow line 715 is printable by an association of print elements deployed to print yellow.

When the image data representing image 700 is divided (indicated by arrows 720), three individual collections of data representing images 725, 730, 735 are formed. Image 725 includes cyan line 705 and is thus printable by an association of print elements deployed to print cyan. Image 730 includes yellow line 715 and is thus printable by an association of print elements deployed to print yellow. Image 735 includes magenta line 710 and is thus printable by an association of print elements deployed to print magenta. Thus, the image data representing images 725, 730, 735 are the result of a division of data representing image 700 according to the deployment of associations of print elements to print different colors.

Figure 8:
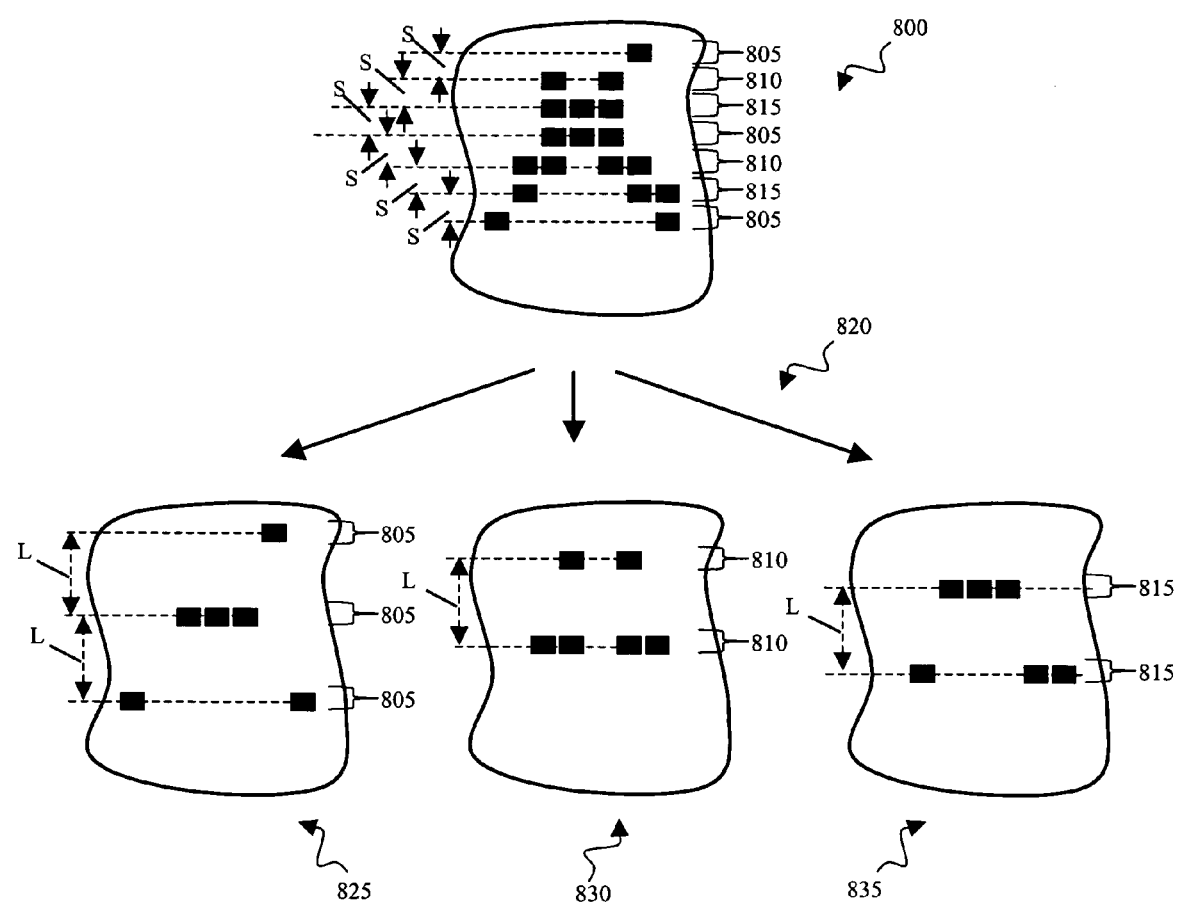

FIG. 8 illustrates another implementation of the division of image data (namely, image data representing a portion of an image 800) according to a deployment of print element associations. In particular, a division according to a deployment of print elements with relative shifts in lateral position is illustrated. The shifts in the lateral position of print elements can correspond to the lateral shifts S between print elements 405, print elements 410, and print elements 415 in the implementation of housing 110 shown in FIG. 4.

Image portion 800 includes collections of pixel rows 805, 810, 815. Pixel rows 805, 810, 815 each include a longitudinal row of pixels. Pixel rows 805 are laterally shifted relative to the position of pixel rows 810 by a shift distance S. Pixel rows 805 are laterally shifted relative to the position of pixel rows 815 by shift distance S. Pixel rows 810 are laterally shifted relative to the position of pixel rows 815 by shift distance S. Shift distance S (and hence the lateral resolution of the printed imaged) is determined by the overall lateral spacing between print elements.

When a workpiece is moved longitudinally across an array of print elements, each pixel row 805, 810, 815 can be printed by an individual print element. For example, when image portion 800 is printed using the implementation of housing 110 shown in FIG. 4, a single print element 405 can print a single pixel row 805, a single print element 410 can print a single pixel row 810, and a single print element 415 can print a single pixel row 815.

When the image data representing image portion 800 is divided (indicated by arrows 820), three individual collections of data representing image portions 825, 830, 835 are formed. Image portion 825 includes pixel rows 805 and is thus printable by a first array of print elements separated by a lateral distance L. Image portion 830 includes pixel rows 810 and is thus printable by a second array of print elements separated by a lateral distance L. Image portion 835 includes pixel rows 815 and is thus printable by a third array of print elements separated by a lateral distance L. The print elements in these arrays are shifted in lateral position relative to one another. Thus, the image data representing image portions 825, 830, 835 are the result of a division of data representing image portion 800 according to the deployment of associations of print elements to print at different lateral positions.

Figure 9:
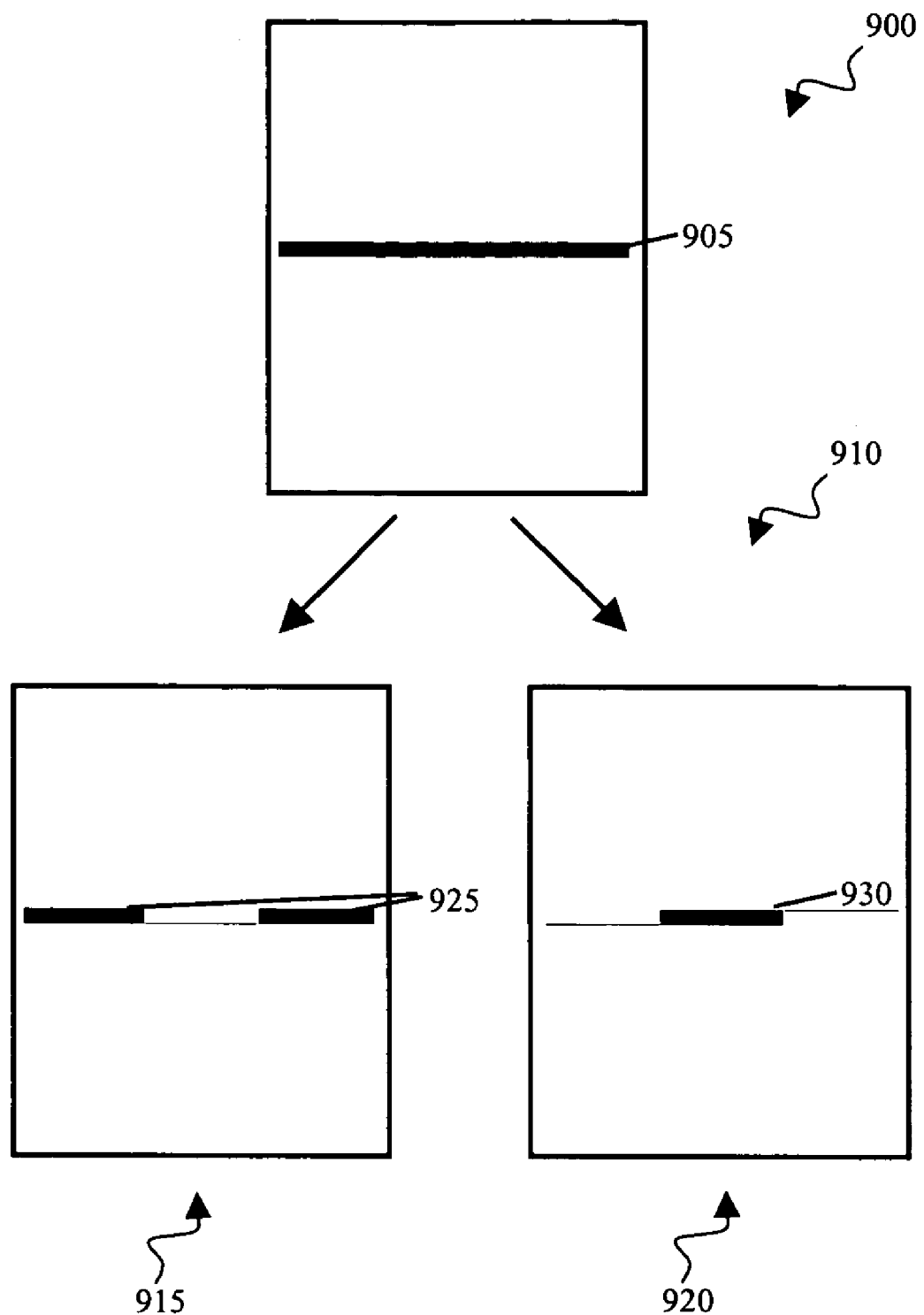

FIG. 9 illustrates another implementation of a division of image data representing an image 900 according to a deployment of print element associations. Image 900 includes a single line 905 that spans the entire lateral expanse of image 900.

When the image data representing image 900 is divided (indicated by arrows 910), two individual collections of data representing images 915, 920 are formed. Image 915 includes two outer line portions 925 and is thus printable by an association of print elements deployed toward the outside of a workpiece. For example, outer line portions 925 may be printable by an association that includes print modules 205, 305, by an association that includes print modules 215, 310, or by an association that includes print modules 225, 315 (FIG. 3).

Image 920 includes a central line portion 930 and is thus printable by an association of print elements deployed toward the center of a workpiece. For example, central line portion 930 may be printable by an association that includes print module 210, by an association that includes print module 220, or by an association that includes print module 230 (FIG. 3). Thus, the image data representing images 915, 920 are the result of a division of data representing image 900 according to the deployment of associations of print elements to print different lateral expanses.

Returning to FIG. 6, the system performing process 650 allocates the image data portions that result from a division to respective image queues at 615. In other words, the allocation results in each buffer of image data being allocated to a respective queue. In general, each buffer of image data corresponds to an association of print elements at a printing device. Similarly, a set of buffers corresponds to a set of image data to be printed by the print element associations. The buffers of image data, which were generated at 610, are queued in queues, with each queue corresponding to a print element association. For example, if there are eight image queues, each image queue corresponding to a print element association, then a set of buffers of image data that correspond to the first print element association may be allocated to the first image queue, a set of buffers of image data that correspond to the second print element association may be allocated to the second image queue, and so on. The memory locations where the image queues and the buffers are located can be dedicated to the storage of image data for printing by a specific print element association. For example, the memory locations may be blocked off from memory management by an operating system and the memory locations may be accessible by a data pump using direct memory access. The queues for the buffers of image data may be first in first out queues (i.e., FIFO queues).

At 620, the system performing process 650 determines whether the system should update the locations indicating where the print image buffers (i.e., buffers of image data) are located. For example, the system might update locations at one or more data pumps. In that example, the data pumps can store a location indicating where print buffers are located at each of the image queues so the data pumps are able to access each of the memory devices where the buffers are located and retrieve image data. If, at 620, the system determines that the locations should be updated, the locations are updated with references to the buffers at 625. Otherwise, image data is received at 605 and the process continues. Also, the process continues at 605 if updated locations are not needed at 620. In some implementations, the process of 650 may stop, for example, if there are no more images to receive (e.g., no more images to print), or if the image queues are full.

A determination is made as to whether printing should start or continue at 627. If not, the process continues at 627. If so, at 630, image data may be retrieved from buffers in the image queues. For example, a data pump may retrieve buffers of image data. In that example, the data pump is able to identify the proper buffers because the locations of the buffers may be updated at the data pump at 625. A sufficient amount of image data for one impression of an association of print elements may be retrieved. Thus, image data may be retrieved from each of the image queues. In alternative implementations, portions of image data representing a portion of a single impression may be retrieved. Similarly, portions of image data representing several impressions may be retrieved. In those implementations, a queue, such as a FIFO queue, may store image data (e.g., sets of buffers of image data).

At 635, positional delays are added to selected portions of image data. The delays are upfront delays that align image data with the associations of print elements to which respective portions of image data correspond. Thus, the extent of the upfront delay can be determined based on the deployment of the print element association to which image data corresponds. For example, a minimal positional delay or no delay at all may be inserted into image data that corresponds to a print element association near the entry of workpieces across an effective print area, whereas a larger positional delay may be inserted into image data that corresponds to a print element association near the exit of workpieces across an effective print area. Because the positional delays correspond to the position of print element associations (or rather, the separation distance between print element associations), the positional delays may differ depending on a type of print head assembly that contains the print element associations. In any case, the positional delays may be a fixed delay(s) for a particular print head assembly and the delays may be measured in an amount corresponding to an amount of print lines.

Inserting an upfront delay into image data can be performed in a number of different ways. For example, an appropriate amount of null "placeholder" data can be inserted before and after the image data portions that result from a division of image data. As another example, the upfront delay can be introduced into a data communication path between a memory location and print elements. For example, a data pump may be aligned such that the data pump can insert different upfront delays for different portions of image data at different memory locations. Image data with delays may be sent to a printing device at 637. In alternative implementations, image data with delays may be added to a queue (e.g., a first in first out queue) prior to sending the data to a printing device. The process at 655 may continue at the process of 627 after image data is sent at 637. In some implementations, the process at 655 may stop after image data is sent at 637 for various reasons. For example, if all image data packets have been sent by a data pump, the data pump may determine at 627 that the system should no longer be printing (i.e., determine not to start or continue printing). In some implementations, empty data image packets may be sent, effectively causing no ink to be deposited on a workpiece.

The system can identify the entry of a leading edge of a workpiece to an effective print area of a print system at 640. The entry of the leading edge can be identified using a workpiece detector (such as workpiece detector 155 (FIG. 1)). The further progress of the workpiece across the effective print area can be followed by sensing the speed of the workpiece, e.g., by measuring the speed of a workpiece conveyor (such as workpiece conveyor 105 (FIG. 1)) using a rolling encoder.

When the workpiece is appropriately positioned, the print system performing process 660 can commence printing of the workpiece at 645. The printing of the workpiece can include relaying image data that has been divided according to the deployment of the print element association. The image data can be relayed from a memory location to the appropriate print element association. The relaying can be driven by a central data processing device, such as a central data processing device in control electronics 160. The relaying can be done on a firing-by-firing basis. In the processes shown in the flowcharts of FIG. 6, a signal may be sent to the system performing the process of 655 (e.g., a data pump) to start printing, causing a relaying of image data to a printing device.

As the workpiece moves across the effective print area, different print elements can be triggered by the same trigger signal to fire at the same instant. Alternatively, different print elements can be staggered to fire at different instants. Regardless of when the actual firing of individual elements occurs, the elements in the effective print area are printing on the initial workpiece at the same time.

In a print system where the effective print area has a longitudinal width that is greater than the separation distance to the next workpiece, one or more workpieces may be positioned beneath the effective print area at the same time. As such, more than one workpiece may be available for serial printing. One example of this situation is illustrated in FIG. 5, where the separation distance SEP between workpieces is smaller than width W of effective print area 235, and, both workpiece 130 and workpiece 135 are positioned beneath effective print area 235 and available to be printed in series.

In such a print system, the system performing process 660 can also identify the entry of the leading edge of a next workpiece at 640. The entry of the leading edge can be identified using a workpiece detector (such as workpiece detector 155 (FIG. 1)). The progress of both an initial workpiece and the next workpiece across the effective print area can be followed by sensing the speed of the workpieces, e.g., by measuring the speed of a workpiece conveyor (such as workpiece conveyor 105 (FIG. 1)).

Printing on both workpieces can continue as the initial workpiece and the next workpiece continue to progress across the effective print area. When the effective print area has a longitudinal width that is greater than the sum of the width of a next workpiece and twice the separation distance between workpieces, an initial workpiece, the next workpiece, and yet another workpiece may be positioned beneath the effective print area at the same time. As such, three workpieces may be available for printing in series. In this case, the system performing process 660 can identify the leading edge of another "next workpiece" at 640 before stopping printing on an initial workpiece. Otherwise, the system can stop printing on the initial workpiece before identifying the leading edge of another "next workpiece" at 640.

In some implementations, image data may be divided based on associations of print modules. In some implementations, print element associations may be split across a single print module. For example, if each print module in a print system includes two rows of print elements, image data may be divided by the rows of print elements. Thus, a space between workpieces may be reduced to zero.

In some implementations, the system(s) performing processes shown in FIG. 6 can calculate the positional delay required between print element associations (rather than having a fixed delay). The memory locations can be dedicated to specific print element associations. For example, individual buffers can store image data for printing by individual print element associations. The system performing processes shown in FIG. 6 can control a data pump or other hardware device to extract data from memory locations at the appropriate point in time to properly place image data on a workpiece on which the image data is to be printed.

Although the processes of FIG. 6 are shown as being composed of a certain number and type of processes, additional and/or different processes can be used instead. For example, in the process of 655, rather than continually determining whether to continue or start printing at 627, the system performing the process of 655 may start printing when started and stop printing when the system decides to stop printing, only to start printing when called on again. Similarly, the processes need not be performed in the order depicted, or by the components that were discussed to have performed certain processes.

Figure 10:
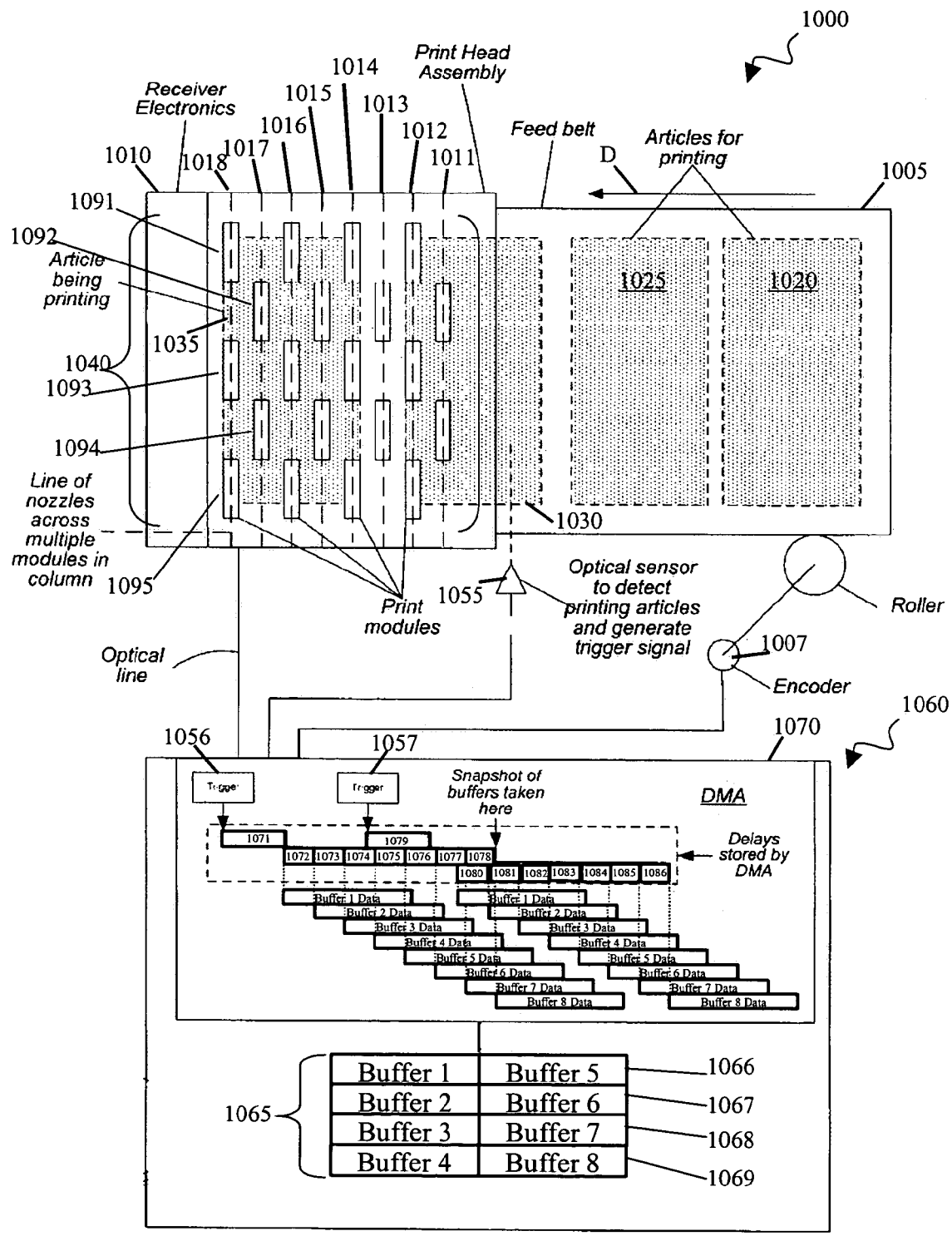
FIG. 10 shows a schematic representation of an implementation of a print system.

FIG. 10 shows a schematic representation of an implementation of a print system 1000. System 1000 includes workpiece conveyor 1005, a printer housing 1010, a workpiece detector 1055, and control electronics 1060.

Workpiece conveyor 1005 conveys workpieces 1020, 1025, 1030, 1035 in a direction D across an effective print area 1040 of printer housing 1010. Workpiece conveyor 1005 includes an encoder 1007 that senses the speed of workpieces 1020, 1025, 1030, 1035. Encoder 1007 also generates a signal that encodes the sensed speed and relays the signal to control electronics 1060. Workpiece detector 1055 is an optical sensor that detects the position of one or more workpieces 1020, 1025, 1030, 1035, and generates trigger signals (such as trigger signals 1056 and 1057) based upon that detection.

Printer housing 1010 includes a collection of print modules arranged laterally along a series of columns 1011, 1012, 1013, 1014, 1015, 1016, 1017, 1018. This arrangement of print modules spans an effective print area 1040. Each group of print modules deployed along each of columns 1011, 1012, 1013, 1014, 1015, 1016, 1017, 1018 constitutes a print element association. As examples, print modules 1091, 1093, 1095 constitute a print element association along column 1018, and print modules 1092, 1094 constitute a print element association along column 1017.

Control electronics 1060 controls the performance of print operations by system 1000. Control electronics 1060 includes a collection of print image buffers 1065. Control electronics 1060 can access the print image buffers in collection 1065 to store and retrieve image data. In the configuration shown in FIG. 10, there are eight print image buffers in collection 1065, and each print image buffer is dedicated to a print element association arranged along one of columns 1011, 1012, 1013, 1014, 1015, 1016, 1017, 1018. For example, print image buffers 1066, 1067, 1068, 1069 may correspond to the print element associations arranged along columns 1015, 1016, 1017, 1018, respectively. In particular, each print element association prints image data only from the associated print image buffer.

Control electronics 1060 also includes a data pump 1070. A "data pump" refers to a functional component, e.g., implemented in hardware, software, programmable logic or a combination thereof, that processes data and transmits it to one or more printing devices for printing. In one implementation, the data pump can refer to a direct memory access (DMA) device. The data pump 1070 is positioned along the data communication path between the print element associations and their dedicated print image buffers in collection 1065. The data pump 1070 can receive and store image data from each print image buffer in collection 1065. The data pump 1070 is programmable by control electronics 1060 to delay the communication of information from the print image buffers in collection 1065 to the print element associations.

In operation, control electronics 1060 can divide image data according to the deployment of print element associations in effective print area 1040. Control electronics 1060 can also allocate the divided image data to an appropriate print image buffer in collection 1065.

As workpiece 1035 is conveyed by workpiece conveyor 1005 to enter effective print area 1040, workpiece detector 1055 detects the leading edge of workpiece 1035 and generates trigger signal 1056. Based on receipt of trigger signal 1056, control electronics 1060 can program data pumps 1070 with positional delays 1071, 1072, 1073, 1074, 1075, 1076, 1077, 1078. Delay 1071 delays the communication of image data from a first print image buffer in collection 1065 to the print element association arranged along column 1011. Delay 1072 delays the communication of image data from a second print image buffer in collection 1065 to the print element association arranged along column 1012. Delays 1073, 1074, 1075, 1076, 1077, 1078 delay the communication of image data from respective print image buffers in collection 1065 to the print element associations arranged along columns 1013, 1014, 1015, 1016, 1017, 1018.

As workpiece 1035 is conveyed by workpiece conveyor 1005 across effective print area 1040, the print element associations arranged along columns 1011, 1012, 1013, 1014, 1015, 1016, 1017, 1018 successively print. In particular, as workpiece 1035 is advanced one scan line across effective print area 1040, the data pump 1070 dumps image data to the appropriate receiver electronics at the print element associations arranged along columns 1011, 1012, 1013, 1014, 1015, 1016, 1017, 1018 (i.e., the data pump 1070 causes the image data to be transmitted to the printing device). The dumped image data identifies print elements that are to fire for the instantaneous position of workpiece 1035 in effective print area 1040 (the identification of print elements may be implicit; e.g., an ordering of image data in a data packet in a format corresponding to an order of print elements and/or print element associations at a printing device). Data for successive firings can be loaded from print image buffers in collection 1065 to the data pump 1070 during firings.

While workpiece 1035 is still being printed, workpiece 1030 can be conveyed by workpiece conveyor 1005 to enter effective print area 1040. Workpiece detector 1055 detects the leading edge of workpiece 1030 and generates trigger signal 1057. Based on receipt of trigger signal 1057, control electronics 1060 may cause the data pump 1070 to insert delays 1079, 1080, 1081, 1082, 1083, 1084, 1085, 1086. Delay 1079 delays the communication of image data from a first print image buffer in collection 1065 to the print element association arranged along column 1011. Delay 1080 delays the communication of image data from a second print image buffer in collection 1065 to the print element association arranged along column 1012. Delays 1081, 1082, 1083, 1084, 1085, 1086 delay the communication of image data from respective print image buffers in collection 1065 to the print element associations arranged along columns 1013, 1014, 1015, 1016, 1017, 1018. Alternatively, delays may already be inserted into image data and the trigger signal may cause the sending of image data by the data pump 1070.

As workpiece 1030 is conveyed by workpiece conveyor 1005 into effective print area 1040, the print element associations arranged along columns 1011, 1012, 1013, 1014, 1015, 1016, 1017, 1018 print upon workpieces 1030, 1025. In particular, as workpieces 1035, 1030 are advanced one scan line, the data pump 1070 dumps image data to the appropriate receiver electronics for the print element and workpieces 1035, 1030 are printed at the same time.

Image data for each workpiece may differ. For example, if two workpieces were to have two different images printed upon them, different image data representing different images would be used to print on each workpiece. In that example, two sets of image data may be gathered at a data pump. A first set of image data may correspond to a first image (e.g., a print line of an image of a frog) and a second set of image data may correspond to a second image (e.g., three print lines of an image of an apple). Gathering the image data may include taking image data from image queues and/or generating a data packet that includes the first and second sets of image data. The gathered image data may be provided to the print element associations by sending a data packet to the printing device that includes the print element associations (e.g., a data packet including the print line of the image of the frog and the three print lines of the image of the apple). When the two workpieces are printed at substantially the same time, a first portion of the print buffers (e.g., print buffer 1066) may store the first set of image data corresponding to the first image (e.g., the print line of the image of the frog) and a second portion of the print buffers (e.g., print buffers 1067, 1068, 1069) may store the second set of image data corresponding to the second image (e.g., the three print lines of the image of the apple). A first set of print elements corresponding to the first set of print buffers (e.g., the print elements in the association of print elements along column 1015) can print the first image (e.g., the print line of the image of the frog) and a second set of print elements corresponding to the second set of buffers (e.g., the print elements in the associations of print elements along columns 1016, 1017, 1018) can print the second image (e.g., the three print lines of the image of the apple). As such, different print elements print two images at substantially a same time (e.g., print elements along the columns 1015, 1016, 1017, 1018 may fire at substantially a same time).

Or, the image data for each workspace may represent the same image. For example, the same image may be continually printed on multiple workpieces. In that example, if two workpieces are printed at substantially a same time, different portions of the same image may reside in different sets of print buffers such that different print elements print different portions of the same image.

Although not shown, in addition to using different sets of print elements to print different portions of image data on different workpieces, a same workpiece may be printed on with different sets of image data.

A number of implementations have been described. Nevertheless, it will be understood that various modifications may be made. Print elements can be deployed in any of a number of different associations. For example, print elements arranged along a same column need not be in the same association. Print modules can include any arrangement or number of print elements, including a single print element.

Accordingly, other implementations are within the scope of the following claims.

What is claimed is:

1. A method of printing one or more images using a printing system comprising control electronics located remotely from a printing device, the printing device having a workpiece conveyor that produces relative longitudinal motion between workpieces and associations of print elements arranged on the printing device, the method comprising:
   the control electronics gathering a plurality of sets of image data to be printed at the printing device, wherein the plurality of sets of image data comprise a first and second set of image data to be printed on respective first and second workpieces at the same time and gathering the plurality of sets of image data comprises:
   the control electronics dividing the first set of image data into a first plurality of portions and dividing the second set of image data into a second plurality of portions, wherein the first set of image data is divided so that each portion of the first plurality of portions is associated with a respective print element association at the printing device and the second set of image data is divided so that each portion of the second plurality of portions is associated with a respective print element association at the printing device; and the control electronics providing, at the same time, a first of the print element associations with an associated portion of the first set of image data and a second of the print element associations with an associated portion of the second set of image data, the provision of the associated portions of the sets of image data controlling timing of printing by the print element associations.

2. The method of claim 1, further comprising the control electronics controlling the timing of the printing, on the first workpiece, of the portion of the first set of image data and the printing, on the second workpiece, of the portion of the second set of image data.

3. The method of claim 2, wherein the printing of the portions of the first and second sets of image data comprises printing each portion of the first and second sets of image data at the same time.

4. The method of claim 2, wherein the printing of the portions of the first and second sets of image data comprises printing the first and second sets of image data as soon as the first and second sets of image data are available for printing.

5. The method of claim 1, wherein gathering the first and second sets of image data comprises the control electronics generating a data packet to be sent to the printing device, the data packet comprising the portions of the first and second sets of image data.

6. The method of claim 1, wherein providing the first and second sets of image data comprises the control electronics sending a data packet to the printing device, the data packet comprising the portions of the first and second sets of image data.

7. The method of claim 1, further comprising:

the control electronics gathering an Nth set of image data to be printed at the printing device, the Nth set of image data divided into an Nth plurality of portions, wherein each portion of the Nth plurality of portions is associated with one of the plurality of print element associations at the printing device;

the control electronics providing to at least one of the print element associations an associated portion of the Nth set of image data and thereby controlling printing of the Nth set of image data and at least one other set of image data according to the print element associations.

8. The method of claim 1, wherein gathering the plurality of sets of image data further comprises the control electronics gathering an Nth set of image data to be printed at the printing device, the Nth set of image data divided into an Nth plurality of portions, wherein each portion of the Nth plurality of portions is associated with one of the plurality of print element associations at the printing device, and providing image data to the print element associations further comprises the control electronics providing to at least one of the print element associations an associated portion of the Nth set of image data.

9. The method of claim 1, wherein the print element associations comprise print elements arranged laterally in a same column across an effective printing area.

10. The method of claim 1, wherein controlling the timing of the printing by the print element associations comprises delaying arrival of the associated portions of the first set of image data at the first of the print element associations.

11. A method of printing two or more images using a printing system comprising control electronics located remotely from a printing device, the printing device having a workpiece conveyor that produces relative longitudinal motion between workpieces and a plurality of associations of print elements laterally arranged on the printing device, the method comprising:

the control electronics receiving image data to be printed at the printing device, the image data representing two or more images to be printed on first and second workpieces and divided into a plurality of portions, each portion corresponding to a respective one of the plurality of print element associations; and the control electronics providing, over a data communication path, each of the print element associations with the corresponding portion of image data and thereby controlling each association of print elements to print its corresponding portion of image data on the first and second workpieces at a same time.

12. The method of claim 11, wherein the image data is divided such that each Nth portion of the plurality of portions corresponds to an Nth print element association.

13. The method of claim 11, wherein controlling each association of print elements comprises the control electronics delaying arrival of a first of the portions of image data at the corresponding print element association.

14. A method of printing using a printing system comprising control electronics located remotely from a printing device, the printing device having a workpiece conveyor that produces relative longitudinal motion between workpieces and a plurality of associations of print elements arranged in an effective print area of the printing device, the method comprising:

the control electronics dividing two or more sets of image data into portions according to the deployment of print elements at the printing device, the sets of image data comprising a first set of image data to be printed on a first workpiece and a second set of image data to be printed on a second workpiece;

the control electronics allocating the divided image data to different memory locations;

the printing device detecting a position of the first workpiece and the second workpiece and generating a trigger signal that is received by the control electronics; and the control electronics communicating the divided image data from the different memory locations to the print elements along a communication path based on receipt of trigger signal and thereby timing printing of the divided image data by the print elements based on the detected positions of the first and second workpieces, wherein the printing comprises a first set of print element associations printing the divided image data representing the first image on the first workpiece and a second set of print element associations printing the divided image data representing the second image on the second workpiece, with the first and second workpiece in the effective print area at the same time.

15. The method of claim 14, wherein printing further comprises an Nth set of print element associations printing divided image data representing an Nth image.

16. The method of claim 14, wherein allocating the divided image data to different memory locations comprises allocating the divided image data to individual memory buffers.

17. The method of claim 16, wherein the individual memory buffers are elements of respective queues of individual memory buffers.

18. The method of claim 16, wherein allocating the divided image data to individual memory buffers comprises allocating the divided image data to an individual memory buffer dedicated to selected print elements.

19. The method of claim 14, wherein timing the printing comprises timing arrival of the divided image data at the print elements based on the position of the workpiece.

20. The method of claim 19, wherein timing the arrival of the divided image data comprises introducing a delay into the communication path.

21. The method of claim 20, wherein introducing the delay into the communication path comprises causing a data pump to delay the arrival of a first portion of the divided image data.

22. The method of claim 14, wherein communicating the divided image data comprises the control electronics delaying arrival of divided image data from a first of the different memory locations at the print elements.

23. A print system comprising:
- a printer housing including a collection of print elements organized into print element associations, each print element association arranged laterally across an effective print area;
- a workpiece conveyor that produces relative longitudinal motion between workpieces and the print elements; and
- control electronics located remotely from the printer housing, the control electronics configured to direct a first association of print elements to print a first image on a first workpiece and a second association of print elements to print a second image on a second workpiece with the first and second workpiece in the effective print area at the same time, the control electronics comprising a timing element configured to time the printing of the first image and the second image according to the deployment of the print elements.

24. The print system of claim 23, wherein the print elements are inkjet nozzles.

25. The print system of claim 23, wherein the control electronics further comprise a data processing device configured to perform operations in accordance with logic of a set of machine-readable instructions, the operations comprising dividing a collection of image data into portions according to a deployment of the print elements.

26. The print system of claim 23, wherein the timing element is configured to delay arrival of data representing the first image at the print elements.

27. A print system comprising:
- an effective print area including print elements deployed in two or more associations; and
- control electronics located remotely from the effective print area, the control electronics configured to divide image data into portions according to the deployment of the associations in the effective print area, the control electronics comprising
  - two or more different memory locations, each memory location configured to store a portion of the image data for a print element association, and
  - a timing element that comprises a delay configured to time arrival of the image data portions at the print element associations and thereby time printing of the image data portions, wherein the printing comprises a first set of print element associations printing divided image data representing a first image on a first workpiece and a second set of print element associations printing divided image data representing a second image on a second workpiece while both the first and second workpieces are in the effective print area at the same time.

28. The print system of claim 27, wherein:
the effective print area includes print elements deployed in associations according to a color printed by the print elements; and
the control electronics are configured to divide the image data into portions according to the color printed by the print elements.

29. The print system of claim 27, wherein:
the effective print area includes print elements deployed in associations according to the lateral position printed by the print elements; and
the control electronics are configured to divide the image data into portions according to the lateral position printed by the print elements.

30. The print system of claim 27, wherein:
the effective print area includes print elements deployed in associations according to an expanse spanned by a collection of the print elements; and
the control electronics are configured to divide the image data into portions according to the expanse spanned by the collection of the print elements.

* * * * *